Figure 3:
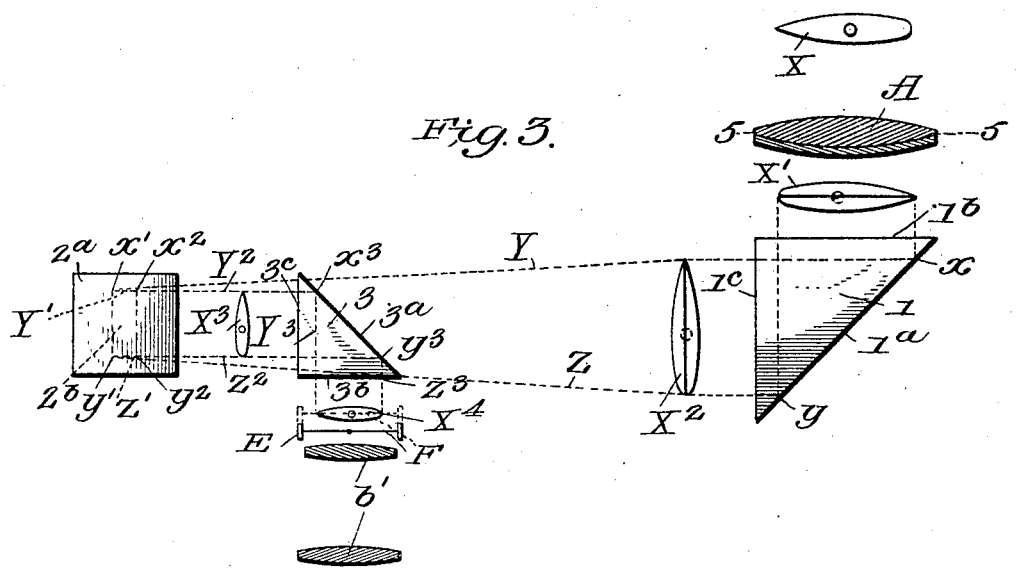

No. 778,694. PATENTED DEC. 27, 1904.
H. C. MUSTIN.
PRISMATIC TELESCOPE.
APPLICATION FILED APR. 26, 1904.
2 SHEETS—SHEET 1.
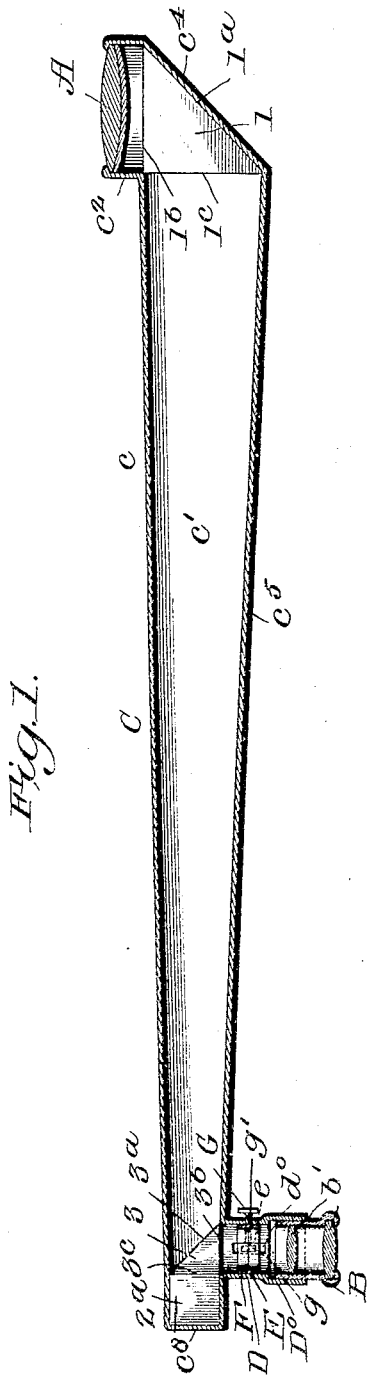
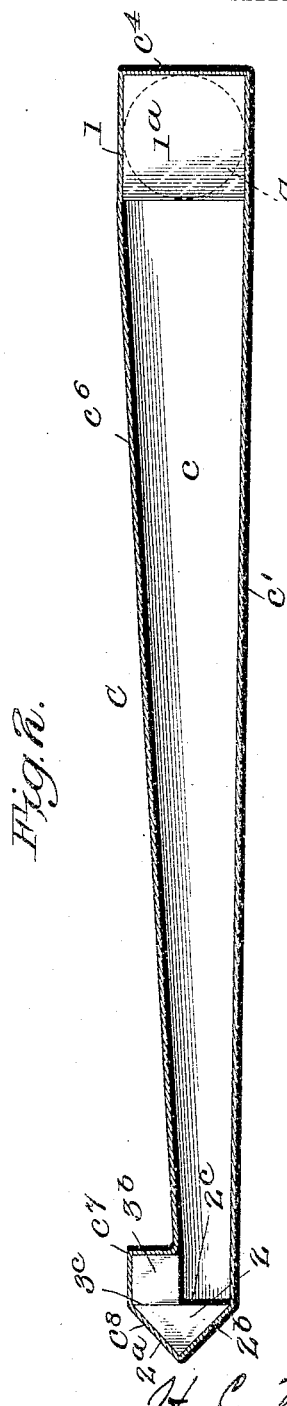
Witnesses
Inventor
H. C. Mustin
By Wilkinson & Fisher
his Attorneys No. 778,694. PATENTED DEC. 27, 1904.
H. C. MUSTIN.
PRISMATIC TELESCOPE.
APPLICATION FILED APR. 26, 1904.

2 SHEETS—SHEET 2.

Witnesses
Geo. A. Byrne.
Stephen Kinsta.

Inventor
H. C. Mustin
By Wilkinson & Fisher
his Attorneys

No. 778,694. Patented December 27, 1904.

UNITED STATES PATENT OFFICE.

HENRY C. MUSTIN, OF PHILADELPHIA, PENNSYLVANIA.

PRISMATIC TELESCOPE.

SPECIFICATION forming part of Letters Patent No. 778,694, dated December 27, 1904.

Application filed April 26, 1904. Serial No. 204,979.

*To all whom it may concern:*

Be it known that I, HENRY C. MUSTIN, a lieutenant in the United States Navy, residing at Germantown, in the city of Philadelphia and State of Pennsylvania, have invented certain new and useful Improvements in Prismatic Telescopes; and I do hereby declare the following to be a full, clear, and exact description of the invention, such as will enable others skilled in the art to which it appertains to make and use the same.

My invention relates to improvements in telescopes, and especially to that type wherein the optical axis is caused to be deflected so that the optical axis of the object-glass or objective opening lies in a different plane from the optical axis of the eyepiece, whereby an object may be viewed from behind a cover without the exposure of the person using the instrument.

The principal object of the invention is to invert the image without the employment of lenses for this purpose and to reduce to a minimum the number of entry and emerging surfaces through which the rays must necessarily pass, it being well known that each entry and emerging surface proportionately reduces the light at approximately two per cent. or more of the light remaining at each surface. To obviate this loss of light, it is apparent, is an especially desirable feature, particularly where the telescope is to be employed for nocturnal use.

Another object of the invention is to so construct and arrange the combination of prisms hereinafter referred to that their disposition in the telescope-tube will be substantially in alinement longitudinally of the tube, whereby a very compact instrument is produced, the prisms being encompassed by a tube in cross-section no greater substantially than the leg-surface of the entrant-prism, while the instrument possesses at the same time all the advantages of a telescope with an angular line of sight and erecting means independent of auxiliary erecting-lenses.

It will also be obvious that in a telescope of this character the disposition of the real image along the optical axis of the eyepiece will be varied in proportion to the distance of the object from the objective-lens. This being true, great difficulties are experienced by the fact that oftentimes the virtual or magnified image is partially obscured by the cross-hairs of the instrument being magnified in a proportion greater than the magnification of the real image. It is particularly desirable, therefore, that the positions of the real image and the cross-hairs coincide in every instance so that they will be magnified with the same intensity; and it is another principal object of the present invention to accomplish this end by providing means for adjusting the cross-hairs longitudinally of the eyepiece, whereby the cross-hairs may be brought to coincide with the real image irrespective of the varying positions of the real image along the optical axis of the eyepiece.

In carrying out my invention I employ a system of prisms which differentiate from the combination of prisms of the well-known Porro telescope in their particular arrangement and disposition relatively to each other. Although, like Porro's combination of prisms, the optical axis is deflected four times at angles of ninety degrees each, unlike the same by my arrangement the emerging rays from the prisms are only deflected twice at angles of ninety degrees, while the prisms themselves are not arranged in combination as a unit, but are separated and suitably disposed relatively to each other at different ends of the telescope opposite the objective and the eyepiece, respectively.

To more fully describe the invention and the particular features of novelty embodied in the claims, reference is had to the accompanying drawings, illustrating the same, in which like reference letters and numerals designate the same parts in the several views, in which—

Figure 4:
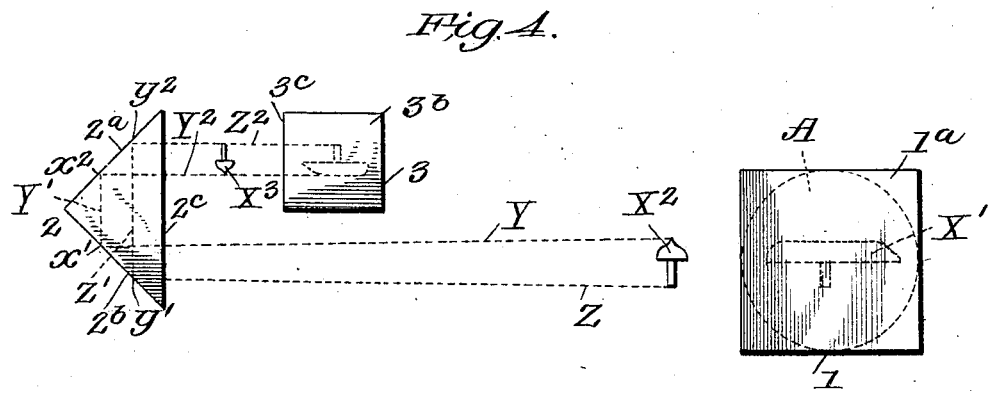

Figure 1 is a longitudinal transverse section through the telescope-tube, the prisms being shown in plan; Fig. 2, a longitudinal vertical section, the prisms being shown in side elevation; Fig. 3, a diagrammatic plan view, the prisms at the eyepiece end of the tube being shown disassociated for the purpose of clearer illustration; Fig. 4, a similar diagrammatic view in side elevation, and Fig. 5 a modified disposition of the object-glass.

A is the object-glass, and B is the eyepiece, carrying a suitable arrangement of magnifying-glasses $b'$.

C is the telescope-tube, the front and bottom sides C and C', respectively, being preferably straight surfaces, at the forward end of which is arranged the rim $c^2$, disposed at right angles thereto for the reception of the object-glass when used in the position forward of the first prism, it being understood that the object-glass may be either located in front or to the rear of the prism. The outer end wall $c^4$ of the tube C diverges rearwardly and inwardly at an angle of forty-five degrees from the front sides $c$ to meet the rear side $c^5$, which, together with the top side $c^6$, inclines toward the opposite end of the tube. At the eyepiece end of the tube is formed a housing for the prisms located at that end, comprising the squared walls $c^7$ and the angular walls $c^8$, formed by the continuation of the top side $c^6$ merging into the bottom side $c'$, the front face being a continuation of the front side $c$ and the rear face a continuation of the rear side $c^5$, an aperture being disposed in the latter and a tube D formed thereon, the outer end being flanged, as at $D^0$, for the reception of the adjustable eyepiece B.

Any suitable means may be utilized for adjusting the cross-hairs relatively to the real image; but for the purposes of illustration I will describe a specific construction for attaining this end.

E represents a short tubular section located within the tube D to the rear of the flanged end $D^0$. This tubular section E is of such diameter as to snugly fit within the tube D, but adapted to be readily moved longitudinally thereof. The cross-wires F are disposed within the short tubular section E, as clearly shown. The lower peripheral surface of the tube-section E is provided with a rack, (shown in dotted lines at $e$,) and opposite this rack and disposed in the same direction is cut a slot $d^0$ in the lower peripheral surface of the tube D. An adjustment-spindle $g'$ is suitably suspended by depending lugs, (not shown,) and one end of the spindle is provided with a milled head G and the other head with a pinion $g$, adapted to register with the slot $d^0$ and engage the teeth on the rack $e$. By this arrangement it will be readily seen that the cross-hairs may be delicately adjusted along the optical axis of the eyepiece independently of the adjustment of the eyepiece, and vice versa.

Figure 5:
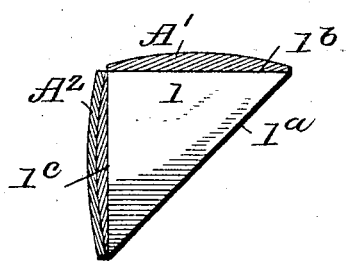

1 is a right-angled isosceles prism, the hypotenuse $1^a$ resting snugly against the outer wall $c^4$ and the leg-surfaces $1^b$ and $1^c$, respectively facing the objective and the longitudinal bore of the tube C. 2 is a right-angled isosceles prism formed by two right-angled isosceles prisms joined at their bases in such a manner that their hypotenuse sides $2^a$ and $2^b$ diverge at a right angle to each other and are adapted to rest snugly against the angular walls $c^8$, the hypotenuse-surface $2^c$ of the two prisms taken conjointly being disposed parallel to the surface $1^c$ of the prism 1 and at right angles to the surface $1^b$ of the latter prism and the lower face of the hypotenuse-surface $2^c$ being opposed to and in line of the rays emerging from the surface $1^c$. 3 is a right-angle isosceles prism located in the housing $c^7$, the hypotenuse-surface $3^a$ being disposed toward the front side $c$ of the tube, with one leg $3^b$ opposite the eyepiece B. The other leg-surface, $3^c$, of this prism is suitably cemented, as with Canada balsam, to the upper face of the hypotenuse $2^c$ of the double prism, or it may be formed integral therewith. By this particular arrangement of the prisms it will be seen that the image is turned around twice through an angle of ninety degrees, whereby it is erected at the eyepiece without the interposition of an erecting-lens. At the same time a tube of comparatively small cross-section may be used, as the leg-surface $1^c$ of the entrant-prism is of an area sufficient to substantially oppose the lower hypotenuse-surface $2^c$ of the prism 2 and the hypotenuse-surface $3^a$ of the prism 3, whereby the whole set of prisms are arranged in substantial alinement longitudinally of the tube. In Fig. 5 I have illustrated an arrangement whereby a further saving of light is attained by dispensing with the entry-surface of the first prism with respect to the object-glass. In this construction the object-glass is split substantially on the line 5 5 of Fig. 3, the outer section A' being suitably cemented to the surface $1^b$ of the prism and the inner section $A^3$ to the surface $1^c$.

Referring now to Figs. 3 and 4, the object X is upset and inverted upon passing through the object-glass, as at X'. The rays entering the prism 1 are totally reflected at the points $x$ $y$ on the hypotenuse $1^a$ and emerge from the surface $1^c$ (the first emergent-surface) at an angle of ninety degrees, the image $X^2$ being still upset, but disposed at an angle perpendicular to its disposition at X'. The rays now pass along the lines Y Z below the prism 3 and enter the lower face of the hypotenuse-surface $2^c$ of double prism 2, are totally reflected at $x'$ $y'$ on the hypotenuse-surface $2^b$ along the lines Y' Z' to the points $x^2$ $y^2$ on the hypotenuse-surface $2^a$, are again totally reflected at these points along the lines $Y^2$ $Z^2$ (the image being righted, as at $X^3$, but still disposed in the same direction as at $X^2$,) thence strike the hypotenuse-surface $3^a$ of the prism 3 at the points $x^3$ $y^3$, are again totally reflected along the lines $Y^3$ $Z^3$ and emerge from the surface $3^b$ (the second emergent-surface) at angles of ninety degrees, the inverted real image appearing as at $X^4$ in proper relative disposition to the object X. As heretofore mentioned, the real image $X^4$ appearing in the tube will be disposed at a point along the optical axis of the eyepiece determined by the distance of the object from the objective. By operating the eyepiece to bring the real image $X^4$ into proper focal distance the virtual image will appear magnified, and the cross-hairs should now be adjusted until they coincide with the real image, as will be evidenced by the lines being brought out sharply in the virtual resultant. It will be observed that at the eyepiece end of the telescope there were three total internal reflections of the rays from the time of entry to emergence—two total reflections within the double-prism 2 and one total reflection in the prism 3.

It is to be understood that although I have described the arrangement of prisms as particularly applicable to a telescope that by combining and suitably arranging two of the telescopes the invention may be readily applied to a binocular-glass for marine or field purposes. It is also obvious that although I have described the optical axis of the objective and the eyepiece as being substantially at right angles to the tube C they may readily be disposed at other angles thereto by a corresponding slight rearrangement of the prisms.

Other modifications might be made without departing from the spirit of my invention; but

What I claim is—

1. In a telescope, the combination with a tube provided at opposite ends with a laterally-disposed objective and a laterally-disposed eye-lens, of a total-reflecting prism having one leg-surface disposed opposite said objective and the other leg-surface disposed transversely of said tube, a twice-totally-reflecting prism adjacent said eye-lens and having substantially one half of its hypotenuse-surface opposed to the transverse leg-surface of said first prism, and a third total-reflecting prism having one of its leg-surfaces joined to the remaining half of the hypotenuse-surface of said twice-totally-reflecting prism, and said third prism having its other leg-surface opposed to said eye-lens.

2. In a telescope the combination with a tube provided at opposite ends with a laterally-disposed objective and a laterally-disposed eye-lens, of a total-reflecting prism having one leg-surface disposed opposite said objective and the other leg-surface disposed transversely of said tube, a twice-totally-reflecting prism adjacent said eye-lens and having its lower hypotenuse-surface opposed to the transverse leg-surface of said first prism, and a third total-reflecting prism cemented on one leg-surface to the upper hypotenuse-surface of said twice-totally-reflecting prism and having its other leg-surface opposed to said eye-lens.

3. In a telescope the combination with a casing having angular end walls and provided with transversely-disposed objective and eye-lenses adjacent said angular end walls, of a total-reflecting prism opposed to said objective and having its hypotenuse-surface coinciding with the forward angular end wall, a pair of total-reflecting prisms having their hypotenuse-surfaces coinciding with said rear angular end walls, and a fourth total-reflecting prism adjacent one of said pair of prisms, the three latter prisms being so combined as to present but one entry and one emerging surface and so disposed relatively to said first prism and eye-lens as to receive the rays from said first prism and deflect the same to said eye-lens.

4. In a telescope comprising a tube provided with an objective and an eye-lens, and means for erecting the real image, in combination with cross-hairs and means for adjusting said cross-hairs, relatively to the real image, along the telescope's optical axis.

5. In a telescope comprising a tube provided with an objective and an eye-lens, and means for erecting the real image, in combination with cross-hairs and means for adjusting said cross-hairs relatively to the real image, comprising a slide carrying the cross-hairs within said tube adjacent said eye-lens, and means for operating said slide along the telescope's optical axis.

6. In a telescope having an angular line of sight, the combination with the telescope-tube provided with objective and eye openings, of an eye-tube opposite said eye-opening, means for erecting and deflecting the image to said eye-tube, cross-hairs located within said eye-tube, and means for adjusting said cross-hairs along the optical axis of said eye-tube with respect to the real image formed.

7. In a telescope having an angular line of sight, the combination with a tube proper provided with an opening located substantially at opposite ends of said tube and disposed angularly thereto, of an eye-tube adjacent said eye-opening, means for erecting the image and deflecting the same to said eye-tube, movable cross-hairs mounted in said eye-tube, means for adjusting said cross-hairs along the optical axis of said eye-tube relatively to the real image, and an eyepiece provided with a magnifying-lens operatively associated with said eye-tube.

8. In a telescope having an angular line of sight, the combination with the tube proper provided with an objective and an eye opening angularly disposed at opposite ends thereof, of an eye-tube adjacent said eye-opening, means for erecting the image and reflecting the same to said eye-tube, a movable cylindrical support within said eye-tube, cross-hairs mounted within said cylindrical support, means for adjusting said cylindrical support along the optical axis of said tube comprising an adjusting-screw operatively connected to said cylindrical support, and an eyepiece adjustable along said eye-tube.

9. In a telescope having an angular line of sight, the combination with the tube proper provided with an objective and an eye opening angularly disposed thereof and arranged out of alinement with each other, of an eye-tube adjacent said eye-opening, means for deflecting and erecting the image comprising a total-reflecting prism opposite said objective-opening and a combination of prisms so arranged adjacent said eye-opening as to receive the rays from said first prism and reflect the same to the eye-tube in three total internal reflections, of cross-hairs adjustably supported within said eye-tube, and means for operating said cross-hairs along the optical axis of said eyepiece relatively to the erected real image.

10. In a telescope the combination with a tube provided with an objective and an eye-lens, of means interposed between same for deflecting and erecting the image, comprising a prism disposed adjacent the objective and a plurality of combined prisms separated from said first prism, said combined prisms being so arranged relatively to said first prism and eye-lens as to receive the rays from said first prism and deflect the same to said eye-lens, cross-hairs, and means for adjusting said cross-hairs, with respect to the real image formed along the telescope's optical axis.

11. In a telescope the combination with a tube provided with an objective and an eye-lens arranged out of alinement, of means interposed between same for deflecting and erecting the image, comprising a total-reflecting prism located adjacent said objective for deflecting the rays toward said eye-lens at right angles thereto, and a plurality of combined prisms adjacent said eye-lens, said combined prisms being so disposed relatively to each other and to said first prism and eye-lens as to receive the rays from said first prism, totally reflect the same in three and only three internal reflections and deflect same to said eye-lens, cross-hairs, and means for adjusting said cross-hairs, with respect to the real image formed, along the telescope's optical axis.

12. In a telescope the combination with a tube provided with an objective and an eye-lens arranged out of alinement, of a total-reflecting prism having one leg-surface disposed opposite said objective and the other leg-surface disposed transversely of said tube, a twice-totally-reflecting prism adjacent said eye-lens and having its lower hypotenuse-surface opposed to the transverse leg-surface of said first prism, a third total-reflecting prism cemented on one leg-surface to the upper hypotenuse-surface of said twice-totally-reflecting prism and having its other leg-surface opposed to said eye-lens, cross-hairs, and means for adjusting said cross-hairs, with respect to the real image formed, along the telescope's optical axis.

13. In a telescope the combination with a tube provided with an objective and an eyepiece, said tube being of such dimensions in cross-section as to receive a suitable combination of opposed prisms arranged substantially in longitudinal alinement, of prisms, for deflecting and erecting the image, disposed adjacent the objective and eyepiece and constructed and arranged to turn the image twice through an angle of ninety degrees in planes at right angles to each other; cross-hairs, and means for adjusting said cross-hairs, with respect to the real image formed, along the telescope's optical axis.

14. In a telescope the combination with a tube provided with an objective and an eyepiece, said tube being of such dimensions in cross-section as to receive a suitable combination of opposed prisms arranged substantially in longitudinal alinement, of means interposed between said objective and eyepiece for deflecting and erecting the image by turning the same twice through an angle of ninety degrees in planes at right angles to each other, comprising a prism disposed adjacent the objective and a plurality of combined prisms separated from said first prism and located adjacent said eyepiece; cross-hairs, and means for adjusting said cross-hairs, with respect to the real image formed, along the telescope's optical axis.

In testimony whereof I affix my signature in presence of two witnesses.

HENRY C. MUSTIN.

Witnesses:
A. M. HYER,
OSCAR E. MAURA.